United States Patent [19]

Kim

[11] Patent Number: 4,618,453

[45] Date of Patent: Oct. 21, 1986

[54] CONDUCTIVE HETEROCYCLIC LADDER POLYMERS

[75] Inventor: Oh-Kil Kim, Burke, Va.

[73] Assignee: The United States of America as represented by the Secretary of the Navy, Washington, D.C.

[21] Appl. No.: 739,354

[22] Filed: May 30, 1985

[51] Int. Cl.$^4$ .......................... C08G 8/02; H01B 1/00
[52] U.S. Cl. .................................. 252/500; 252/510; 252/512; 252/518; 528/125; 528/126; 528/128; 528/226
[58] Field of Search ............... 528/125, 126, 128, 226; 252/500, 510, 512, 518

[56] References Cited

U.S. PATENT DOCUMENTS

| | | | |
|---|---|---|---|
| 4,423,202 | 12/1983 | Choe | 528/185 |
| 4,505,841 | 3/1985 | Denisevich, Jr. | 252/500 |
| 4,505,844 | 3/1985 | Denisevich, Jr. | 252/500 |

FOREIGN PATENT DOCUMENTS 1506282  11/1967  France .............................. 528/226

Primary Examiner—Lester L. Lee
Attorney, Agent, or Firm—Robert F. Beers; Sol Sheinbein; Edward V. Hiskes

[57] ABSTRACT

Phenothiazine Ladder Polymer, PTL (or di-chloro-PTL) was prepared by polycondensation of 2,5-diamino-1,4-benzenedithiol with 2,5-dichloro (or 2,3,5,6-tetrachloro)-p-benzoquinone in polyphosphoric acid at 250° C. Phenoxazine Ladder Polymer, POL, was prepared from 2,5-dichloro-p-phenylenediamine and 2,5-dihydroxy-p-benezoquinone under the same conditions as used for PTL synthesis. Di-chloro-POL and other derivatives can be made under a similar condition. These polymers conduct electricity.

14 Claims, 2 Drawing Figures

THERMAL STABILITY AND CONDUCTIVITY

CONDUCTIVE HETEROCYCLIC LADDER POLYMERS

BACKGROUND OF THE INVENTION

The present invention pertains generally to electroactive materials and in particular to electroactive organic ladder polymers.

The electrical properties of organic polymers have attracted a great deal of attention from the scientific and industrial communities. Conductive polymers would be useful for the production of light weight batteries for electric vehicles and for use in place of metallic conductors aboard aircraft, where weight is an important consideration. They may also prove useful where corrosion resistance is required.

OBJECTS OF THE INVENTION

Accordingly, it is one object of this invention to obtain an organic ladder polymer with high electrical conductivity.

It is a further object of this invention to obtain a conductive ladder polymer that is stable against both thermal and chemical degradation.

SUMMARY OF THE INVENTION

The above and other objects are obtained by synthesizing phenothiazine (PTL) and phenoxazine (POL) heterocyclic ladder polymers. PTL was prepared by polycondensation of 2,5-diamino-1,4-benzenedithiol with 2,5-dichloro-p-benzoquinone in phosphoric acid at 250 degrees centigrade. POL was prepared from 2,5-dichloro-p-phenylenediamine and 2,5-dihydroxy-p-benzoquinone under the same conditions used for PTL synthesis. Alternatively, di-halo and mono-halo PTL's and POL's may be produced.

DETAILED DESCRIPTION OF THE INVENTION

Phenothiazine (PTL) and di-chloro PTL (DC-PTL) heterocyclic ladder polymers may be prepared by polycondensation of 2,5-diamino-1,4-benzenedithiol with 2,5-dichloro (or 2,3,5,6-tetrachloro)-p-benzoquinone.

Likewise, phenoxazine (POL) and di-chloro POL (DC-POL) heterocyclic ladder polymers may be prepared by polycondensation of 2,5-dichloro-p-phenylenediamine with 2,5-dihydroxy (or 2,5-dihydroxy 3,6-dichloro)-p-benzoquinone.

Figure 1:
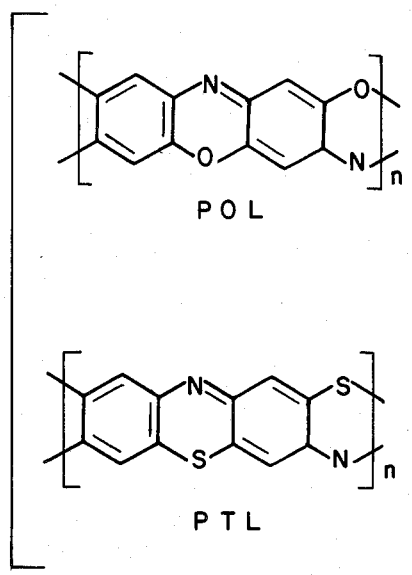
FIG. 1 is a diagram of the structures of PTL and POL ladder polymers.

These polymers are black colored powder and are negligibly soluble in concentrated sulfuric acid or other polar solvents. FIG. 1 is a diagram showing the structure of these polymers.

Conductivities of the present ladder polymers were measured as compressed disks using the standard four-point probe technique. The room temperature conductivity of PTL was unusually high for an organic polymer, with a range from $10^{-5}$ to $10^{-6}$ mho/cm, depending upon minor variations in polymerization conditions. The average conductivity was $4 \times 10^{-6}$ mho/cm. Conductivities of DC-PTL and POL were $3 \times 10^{-7}$ and $1 \times 10^{-8}$ mho/cm, respectively.

X-ray studies of the polymerization product of this invention indicate that large portions of the black powder product are not of a crystalline nature. This indicates that conductivity is not a result of crystallinity.

Figure 2:
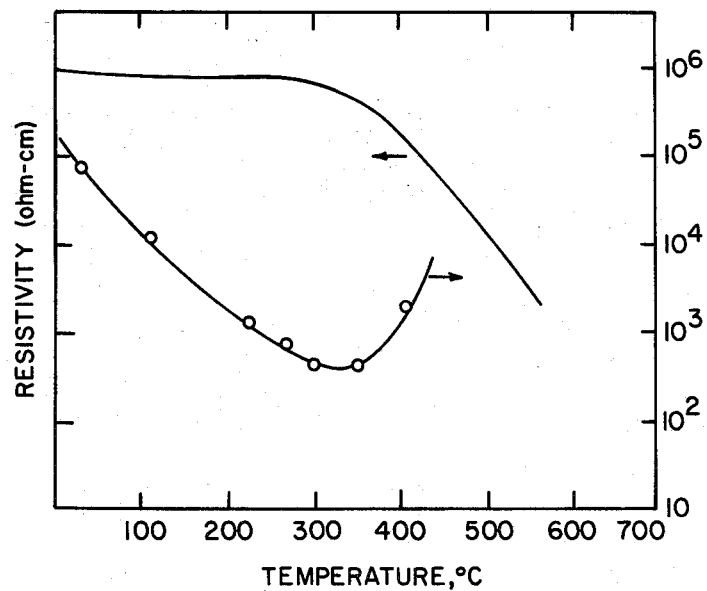
FIG. 2 is a chart demonstrating the conductivity and thermal stability of PTL.

The continuous fused ring polymerized ladder structure of these polymers is very stable against thermal degradation. FIG. 2 is a graph regarding PTL which illustrates the percentage of weight lost by PTL as a function of temperature. It may be seen that substantially all of the weight of PTL is conserved in heatings to as high as 300 degrees C. Furthermore, a substantial portion of the room temperature conductivity is also conserved at these elevated temperatures.

Tested methods for synthesizing these ladder polymers are described below.

PTL SYNTHESIS: METHOD A

To produce PTL, 60 g of polyphosphoric acid is placed into a 100 ml three-neck round bottom flask equipped with a mechanical stirrer and a gas inlet. The flask is nitrogen purged at 80 degrees C. overnight. The temperature is then lowered to 40 degrees C. While that temperature is maintained under continuous nitrogen bubbling 2,5-diamino-1,4-benzenedithiol-2HCL, 1.22 g (0.005 moles), is added. Then, 2,5-dichloro-p-benzoquinone, 0.866 g (0.005 moles) is added. A dark blue mixture results. This mixture is slowly heated up to 250 degrees C. over a period of 6 hours. A black, viscous mixture results. This black, viscous mixture is maintained at 250 degrees C. for an additional 15 hours. The result is a black semi-solid. This semi-solid is washed with water and then with dilute aqueous ammonium hydroxide. A black suspension is washed out of the solid. Further black suspension is washed out or extracted in by processing the semi-solid in a Soxhlet extractor first with water for three days, then with ethanol for two days. The remaining black solid is air dried and then vacuum-dried at 70 degrees C. for 2 days, yielding 1.5 g PTL, which is not soluble.

PTL SYNTHESIS: METHOD B

N,N-dimethylacetamide (30 ml) is placed in a 100 ml three-neck round bottom flask equipped as in Method A. The flask is purged in a nitrogen atmosphere at room temperature. While nitrogen is bubbling in the flask, 2,5-dichloro-p-benzoquinone, 0.443 g (0.0025 moles), is added to the flask with stirring. While the solution is kept over an ice bath, 2,5-diamino-1,4-benzenedithiol-2HCl, 0.61 g (0.0025 moles) is added. After allowing this mixture to stand at room temperature for an hour, the mixture is gradually heated up to 150 degrees Centigrade over a six hour period. It is kept at this temperature for an additional 15 hours. The grayish-black product obtained is treated in the same manner as the semi-solid obtained in from the heating step in Method A.

DC-PTL SYNTHESIS

DC-PTL (wherein "DC" denotes "di-chloro") is produced as in PTL in Method A except that tetrachloro-p-benzoquinone, 1.23 g (0.005 mole), is used as a starting material, rather than 2,5-dichloro-p-benzoquinone. 1.15 g of black, insoluble DC-PTL was obtained.

POL/DC-POL SYNTHESIS

Method A for PTL applies for POL except that 2,5-dichloro-p-phenylenediamine, 0.885 g (0.005 moles) and 2,5-dihydroxy-p-benzoquinone, 0.704 g (0.005 moles) are the starting materials. For DC-POL, 1.045 g (0.005 moles of 2,5-dihydroxy-3,6-dichloro-p-benzoquinone is used in place of 2,5-dichloro-p-phenylenediamine.

The similar electronic configurations and chemical behavior of the halogens suggests that any halogen could be substituted at the sites of the two chlorine atoms in DC-POL or DC-PTL. In addition, mono-halogen POL's or PTL's could be produced, wherein a halogen displaces only one proton. Furthermore, electronic considerations suggest that a chalcogen other than O or S could be used at the appropriate site.

The conductivity of these ladder polymers may be increased by doping with various Lewis or protonic acid materials, including $I_2$, $AsF_5$, $SO_3$, $H_2SO_4$, $HClO_4$, and $ClSO_3H$. Bases that may be used include alkali metals and their complexes in solvents such as benzene or tolulene.

Doping may be accomplished by vaporizing the dopant into an evacuated tube containing the polymer sample or by direct immersion of the polymer sample into a dopant solution. Dopant may be added in such quantity as to saturate the polymer sample.

Doping with any of the above mentioned compounds improved the conductivity of a sample of PTL by at least two orders of magnitude from an initial value of $5.0 \times 10^{-6}$. The most effective dopant found was $ClSO_3H$, which produced a conductivity of $2.1 \times 10^{-2}$ mho/cm. This dopant also proved to be most effective with a sample of POL with which the initial conductivity was $1.7 \times 10^{-8}$, and the conductivity after doping was $7.7 \times 10^{-5}$ mho/cm.

Doping appears to be more effective with protonic acids, rather than Lewis acids.

The person of ordinary skill in the art will be able to conceive many other processes that will produce PTL or POL condensation products. These are presented by way of illustration only, and in no way limit the scope of this disclosure, or the scope of the claims which follow:

What is claimed is:

1. A polymer of the formula:

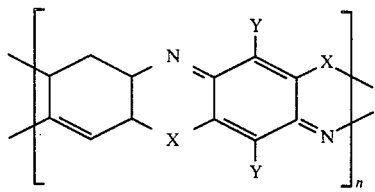

wherein X is a chalcogen;
wherein Y is hydrogen or halogen; and n is the number of repeating units of said polymer.

2. The polymers of claim 1 wherein the chalcogen is oxygen or sulfur.

3. The polymers of claim 2 wherein each Y is selected from a group consisting of hydrogen and chlorine.

4. The polymers of claim 2 wherein each Y is selected from a group consisting of halogen and hydrogen.

5. A polymer of the formula:

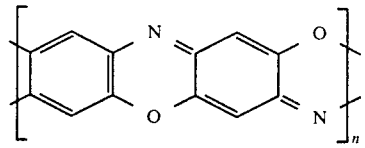

wherein n is the number of repeating units of said polymer.

6. A polymer of the formula:

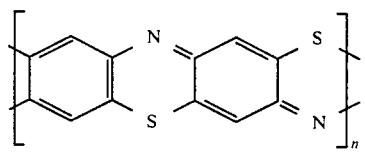

wherein n is the number of repeating units of said polymer.

7. The polymers of claim 1 doped with an acid.

8. The polymers of claim 1 doped with a protonic acid.

9. The polymers of claim 1 doped with a substance from the group consisting of:

$I_2$, $AsF_5$, $H_2SO_4$, $SO_3$, $HClO_4$, and $ClSO_3H$.

10. The polymers of claim 1 doped with a base.

11. The polymers of claim 1 doped with an alkali metal.

12. The polymers of claim 1 doped with an alkali metal complex.

13. The polymers of claim 1 doped with a metal selected from the group consisting of Li, Na, and K.

14. The polymers of claim 1 doped with a substance from the group containing n-butyl Li and sodium napthalate.

* * * * *